United States Patent [19]

Asou et al.

[11] Patent Number: 5,441,233
[45] Date of Patent: Aug. 15, 1995

[54] ELECTROMAGNETIC VALVE

[75] Inventors: Yoshio Asou; Hideharu Sato; Keisuke Shimauchi; Takumi Matsumoto, all of Yawara, Japan

[73] Assignee: SMC Corporation, Tokyo, Japan

[21] Appl. No.: 210,367

[22] Filed: Mar. 18, 1994

[51] Int. Cl.⁶ .................. F16K 31/06; F15B 13/044
[52] U.S. Cl. ...................... 251/129.15; 137/625.25
[58] Field of Search .............. 137/625.65; 251/129.15

[56] References Cited

U.S. PATENT DOCUMENTS 3,510,814  5/1970  Nordfors ............... 251/129.15 X
3,747,623  7/1973  Greenwood et al. ...... 137/625.65 X
4,643,393  2/1987  Kosugi et al. .......... 251/129.15 X Primary Examiner—Gerald A. Michalsky
Attorney, Agent, or Firm—Oblon, Spivak, McClelland, Maier & Neustadt

[57] ABSTRACT

In order to prevent wearing caused by collision when a movable iron core is drawn to a fixed iron core and also to prevent wearing caused by contact when the movable iron core slides in an iron core hole of an electromagnetic valve, a cap mounted on a forward end of the movable iron core and made of an elastic material is provided with a guide tube unit to be engaged in an iron core hole and with a flange unit located on outer side of the iron core hole. Outer diameter of the guide tube unit is designed slightly larger than outer diameter of the movable iron core, and it is slidably engaged in the iron core hole. Distance between the flange unit and outer wall of the iron core hole is designed slightly shorter than distance between the movable iron core and the fixed iron core so that, when power is turned on, the flange unit is brought into contact with outer wall of the iron core hole before the movable iron core collides against the fixed iron core.

3 Claims, 1 Drawing Sheet

ELECTROMAGNETIC VALVE

BACKGROUND OF THE INVENTION

The present invention relates to an electromagnetic valve for switching flow passage by solenoid means.

In an electromagnetic valve of this type, in which flow passage is switched over by solenoid means, a valve member for opening and closing a valve seat in a flow passage of a fluid is generally held by a movable iron core in solenoid means, and when power to a coil is turned on, the movable iron core is drawn to a fixed iron core and the valve member is separated from the valve seat. When power is turned off, the movable iron is separated from the fixed iron core by resilient force of a return spring, and the valve member is attached on the valve seat.

In such an electromagnetic valve, when the movable iron core is drawn to the fixed iron core, the two iron cores collide against each other violently, and a contacting surfaces of the two iron cores tend to be worn out. In particular, in case switching is performed frequently or electromagnetic attracting force is high, the two iron cores are more likely to subject to wearing.

The above movable iron core is slidably inserted into an iron core provided in the solenoid means in normal case. When operated, it slides along inner wall of iron core hole, and the sliding causes the movable iron core and wall of iron core hole to wear. Because the iron hole is designed in such manner that it is continuous to a bobbin wound with coil and to a metal magnetic plate, which is a part of a magnetic frame enclosing the bobbin and is abutted to end surface of the bobbin, the movable iron core always slides along the metal magnetic plate, and the contacting portions of these components are very easily worn out.

SUMMARY OF THE INVENTION

It is an object of the present invention to provide an electromagnetic valve, by which it is possible by means of a simple mechanism to reliably prevent wearing of a movable iron core and a fixed iron core when these are drawn to and collided against each other and also wearing due to contact and sliding between the movable iron core and wall of iron core hole.

To attain the above object, the electromagnetic valve of the present invention comprises a plurality of ports, through which fluid flows in or out, a valve seat mounted in a flow passage, which communicates said ports, a valve member for opening and closing said valve seat, a movable iron core movably inserted into an iron core hole in a solenoid unit and holding said valve member in a recess at end surface thereof, when power to coil is turned on, said movable iron core being drawn to a fixed iron core and separating said valve member from said valve seat, and when power is turned off, said movable iron core being separated from the fixed iron core by force of a return spring and attaching said valve member to the valve seat, and a cap mounted on a forward end of said movable iron core and made of an elastic material for engaging with said valve member and for preventing said valve member from moving out of the recess, said cap having a guide tube unit to be engaged in the iron core hole and a flange unit located on outer side of said iron core hole, said guide tube unit having outer diameter slightly larger than outer diameter of the movable iron core, the movable iron core being prevented from contacting said iron core hole by making said guide tube unit slidably contact the iron core hole, distance between said flange unit and outer wall of the iron core hole being designed slightly shorter than distance between the movable iron core and the fixed iron core so that, when power is turned on, the flange unit is brought into contact with outer wall of the iron core hole before the movable iron core collides against the fixed iron core.

In a concrete aspect of the present invention, said iron core hole is formed on a magnetic plate, which is a part of a magnetic frame enclosing the coil, and the guide tube unit of the cap is engaged in the iron core hole of said magnetic plate.

DETAILED DESCRIPTION OF THE PREFERRED EMBODIMENT

Figure 1:
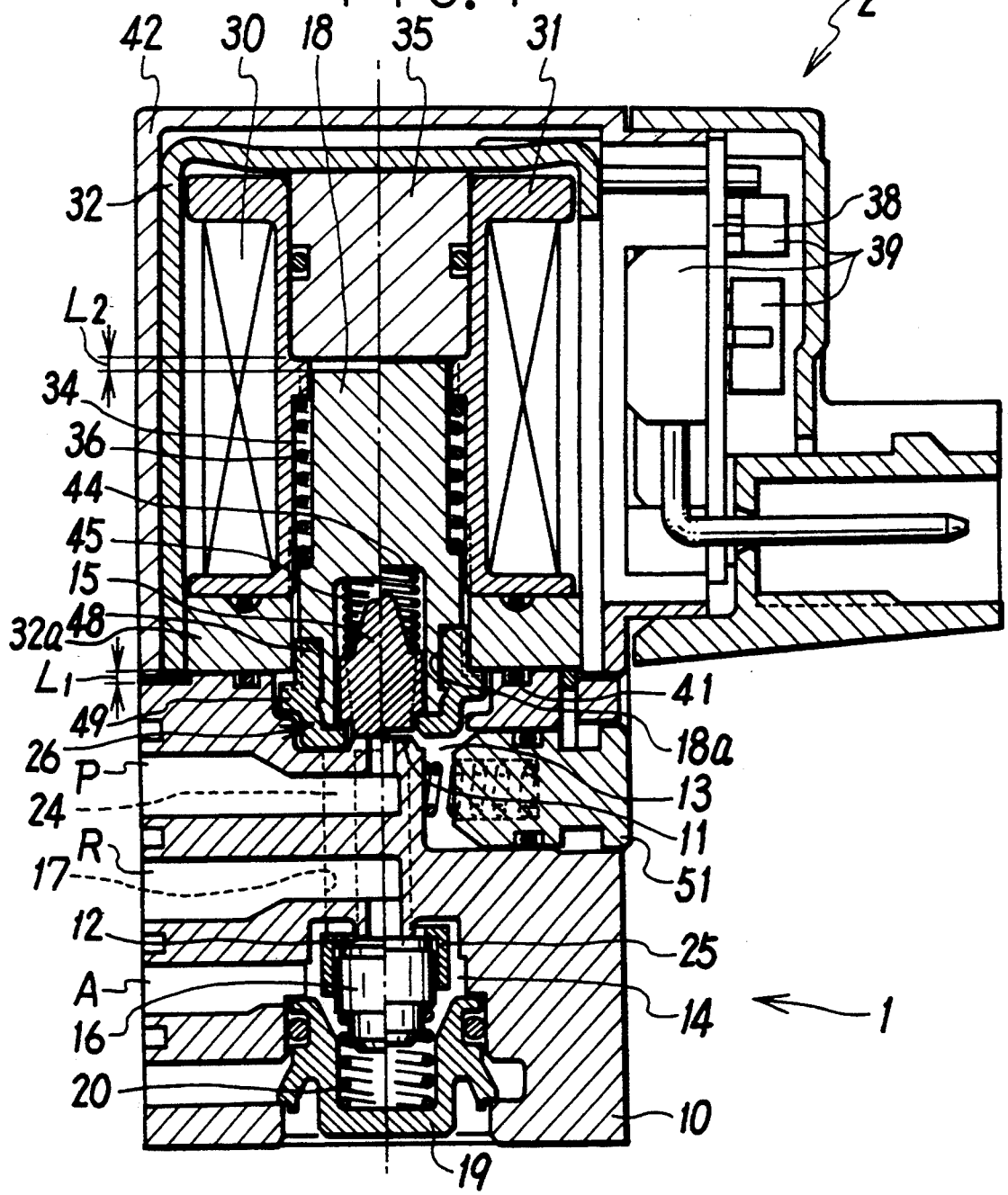
FIG. 1 is a cross-sectional view of an embodiment of an electromagnetic valve according to the present invention.

FIG. 1 shows an electromagnetic valve, which comprises a valve unit 1 for switching over flow passage of fluid by a valve member and a solenoid unit 2 for operating said valve member.

The valve unit 1 has a valve body 10. The valve body 10 comprises an input port P connected to a supply source of a pressure fluid such as compressed air, an output port A connected to an actuator such as air cylinder, and a discharge port R opened to the atmospheric air. Also, there are provided a supply valve seat for connecting the input port P and the output port A via a communication hole 17, and a discharge valve seat 12 for connecting the output port A and the discharge port R, the two valve seats being arranged on the same axial line at back-to-back position.

In a supply valve chest 13, to which the above supply valve seat 11 is opened, a supply valve member 15 for opening and closing said supply valve seat 11 is provided as it is being held by a movable iron core 18 of a solenoid unit 2. In a discharge valve chest 14, to which the discharge valve seat 12 is opened, a discharge valve member 16 for opening and closing the discharge valve seat 12 is provided so that it is pushed in a direction to close the discharge valve seat 12 by a valve spring 20 compressibly arranged in a spring seat 19.

A push rod 24 is inserted into said communication hole 17, and lower end of the push rod 24 is brought into contact with upper surface of a cap-shaped push member 25 mounted on the discharge valve member 16. Upper end of the push rod 24 is brought into contact with lower surface of a cap 26 mounted on lower end of the movable iron core 18 of the solenoid unit 2. When the movable iron core 18 moves down and the supply valve member 15 closes the supply valve seat 11, the push rod 24 is pushed down by the movable iron core 18, and the discharge valve member 16 is pushed down and the discharge valve seat 12 is opened. When the movable iron core 18 moves up and the supply valve member 15 opens the supply valve seat 11, the push rod 24 and the discharge valve member 16 move up, and the discharge valve seat 12 is closed.

The solenoid unit 2 comprises a bobbin 31 with a coil 30 wound on it, a magnetic frame 32 enclosing said bobbin 31, a fixed iron core 35 fixed on one end of an iron core hole 34, said movable iron core 18 slidably inserted into said iron core hole, and a return spring 36 for pushing the movable iron core 18 in a direction to separate from the fixed iron core 35. The iron core hole 34 is designed in such manner that it is continuous to said bobbin 31 and to a magnetic plate 32a, which is arranged to contact end surface of said bobbin 31 as a part of a magnetic frame 32. The fixed iron core 35 is fixed on upper end of the iron core 34, and the movable iron core 18 is inserted below the fixed iron core 35. The solenoid unit 2 is provided with a wiring board 38 to supply power to the coil 30, and electric and electronic components such as resistors required for solenoid control or counter-electromotive force preventive device, etc. are mounted on the wiring board 38. The solenoid unit 2 is fluid-tightly assembled on the valve unit 1 via a seal ring 41, and outer surface thereof except the portion where the solenoid unit is assembled is molded by a coating member 42 such as synthetic resin.

The movable iron core 18 has a recess 44 on its lower end surface, and the supply valve member 15 and a valve spring 45 for pushing the supply valve member 15 in a direction to move it out of the recess 44 are accommodated in said recess 44. To prevent the supply valve member 15 from moving out of the recess 44, a cap 26 made of an elastic material such as synthetic resin is mounted on a portion with reduced diameter 18a at lower end of the movable iron core 18.

Figure 2:
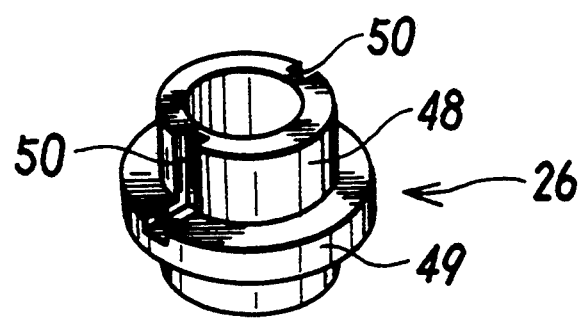
FIG. 2 is a perspective view of a cap mounted at a forward end of a movable iron core.

As it is evident from FIG. 2, the cap 26 has a hole 47 for exposing the supply valve member 15 to outside on its lower surface, and edge of the hole 47 engages with peripheral portion of the supply valve member 15 to prevent the supply valve member 15 from moving out. The cap 26 comprises a guide tube unit 48 engaged with a portion of the iron core hole 34 formed on the magnetic plate 32a, and a flange unit 49 located outside the iron core hole 34. From the side of the guide tube unit 48 to the upper surface of the flange unit 49, a flow groove 50 for passing fluid is provided.

Outer diameter of the guide tube unit 48 is designed slightly larger than outer diameter of the movable iron core 18, and the guide tube unit 48 is slidably engaged in the iron core hole 34. This prevents the movable iron core 18 from being brought into contact with the magnetic plate 32a.

When the movable iron core 18 is not drawn and attached to the fixed iron core 35 (as shown in left half of FIG. 1), distance L1 between the flange unit 49 and the magnetic plate 32a is designed slightly shorter than distance L2 between the movable iron core 18 and the fixed iron core 35. When power is connected to the coil 30, the flange unit 49 is brought into contact with the magnetic plate 32a before the movable iron core 18 collides against the fixed iron core 35 so that the collision of the two iron cores can be avoided.

In the figure, reference numeral 51 represents a manual button for opening the supply valve seat 11 by pushing pressure.

In an electromagnetic valve with the above arrangement, when power is not connected to the coil 30, the movable iron core 18 moves down as shown in left half of FIG. 1, and the supply valve member 15 closes the supply valve seat 11 by resilient force of the valve spring. The discharge valve member 16 pushed by the push member 25 opens the discharge valve seat 12, and the port A is communicated with the port R.

When power to the coil 30 is turned on, the movable iron core 18 is drawn to the fixed iron core 35 against resilient force of the return spring 36. Thus, the supply valve member 15 opens the supply valve seat 11. By resilient force of the valve spring 20, the discharge valve member 16 closes the discharge valve seat 12, and the port P is communicated with the port A.

Because outer diameter of the guide tube unit 48 in the cap 26 is slightly larger than outer diameter of the movable iron core 18, the movable iron core 18 is guided by the guide tube unit 48 and is moved without being brought into contact with the magnetic plate 32a. Also, because the distance between the flange unit 49 of the cap 26 is slightly shorter than the distance between the movable iron core 18 and the fixed iron core 35, the flange unit 49 is brought into contact with the magnetic plate 32a before the movable iron core 18 collides against the fixed iron core 35, and collision of the two iron cores is thus prevented.

As the result, it is possible to prevent wearing caused by collision of the movable iron core 18 and the fixed iron core 35, and also to prevent wearing caused by sliding and contact of the movable iron core 18 with the magnetic plate 32a.

When power to the coil 30 is turned off, the movable iron core 18 is guided by the guide tube unit 48 and returns to the initial position without being brought into contact with the magnetic plate 32a. In this case, the movable iron core 18 returns to the initial position from a position not closely attached on the fixed iron core 35, and this provides higher responsiveness when it returns.

The above description has been given on a 3-port valve, while the electromagnetic valve of the present invention is not limited to this, and any valve having a plurality of ports may be used.

As described above, it is possible according to the present invention to prevent sliding and contact of the movable iron core 18 and the magnetic plate 32a and collision of the two iron cores 18 and 35, to elongate service life of the electromagnetic valve by preventing wearing of components and members, and to increase responsiveness when the movable iron core 18 returns to the initial position.

In order to prevent the valve member from moving out, wearing is prevented by means of the cap 26 mounted on the movable iron core 18. Thus, there is no need to provide additional component to prevent wearing, and this simplifies the arrangement to eliminate wearing.

What we claim are:

1. An electromagnetic valve, comprising:
   a plurality of ports, through which fluid flows in or out;
   a valve seat arranged in a flow passage communicating with said plurality of ports:
   a valve member for opening and closing said valve seat; a movable iron core movably inserted into an iron core hole in a solenoid unit and holding said valve member in a recess at an end surface thereof, when power to coil is turned on, said movable iron core being drawn to a fixed iron core and separating said valve member from said valve seat, and when power is turned off, said movable iron core being separated from the fixed iron core by a force of a return spring and attaching said valve member to the valve seat; and
   a cap mounted on a forward end of said movable iron core and made of an elastic material for engaging with said valve member and preventing said valve member from moving out of the recess, said cap having a guide tube unit to be engaged in the iron core hole and a flange unit located on an outer side of said iron core hole, with the flange unit adjacent an outer wall of the iron core hole, said guide tube unit having an outer diameter slightly larger than an outer diameter of the movable iron core, the movable iron core being prevented from contacting said iron core hole by making said guide tube unit slidably contact the iron core hole, a distance between said flange unit and the outer wall of the iron core hole being shorter than a distance between the movable iron core and the fixed iron core so that, when power is turned on, the flange unit is brought into contact with the outer wall of the iron core hole before the movable iron core collides against the fixed iron core.

2. An electromagnetic valve according to claim 1, wherein said iron core hole is formed on a magnetic plate, which is a part of a magnetic frame enclosing said coil, and the guide tube unit of said cap is engaged in the iron core hole of said magnetic plate.

3. The electromagnetic valve according to claim 2, wherein said outer wall of the iron core hole is an end wall of said magnetic plate, and wherein said flange unit is brought into contact with said end wall before the movable iron core collides against the fixed iron core when power is turned on.

\* \* \* \* \*